United States Patent
Van Lunteren

(10) Patent No.: US 12,141,579 B2
(45) Date of Patent: Nov. 12, 2024

(54) INFERENCE PROCESSING OF DECISION TREE MODELS USING VECTOR INSTRUCTIONS

(71) Applicant: INTERNATIONAL BUSINESS MACHINES CORPORATION, Armonk, NY (US)

(72) Inventor: Jan Van Lunteren, Ruschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 18/183,187

(22) Filed: Mar. 14, 2023

(65) Prior Publication Data
US 2024/0311148 A1    Sep. 19, 2024

(51) Int. Cl.
| | | |
|---|---|---|
| G06F 9/30 | (2018.01) | |
| G06F 16/901 | (2019.01) | |
| G06N 5/01 | (2023.01) | |
| G06N 5/04 | (2023.01) | |
| G06N 20/00 | (2019.01) | |

(52) U.S. Cl.
CPC ...... *G06F 9/30036* (2013.01); *G06F 16/9027* (2019.01); *G06N 5/01* (2023.01); *G06N 5/04* (2013.01); *G06N 20/00* (2019.01)

(58) Field of Classification Search
CPC ... G06F 9/30036; G06F 16/9027; G06N 5/01; G06N 5/04; G06N 20/00
See application file for complete search history.

(56) References Cited

U.S. PATENT DOCUMENTS

| | | | | |
|---|---|---|---|---|
| 10,621,489 | B2* | 4/2020 | Appuswamy | G06N 3/045 |
| 11,886,725 | B2* | 1/2024 | Van Lunteren | G06F 17/11 |
| 2020/0042856 | A1* | 2/2020 | Datta | G06N 3/045 |
| 2022/0198281 | A1* | 6/2022 | Van Lunteren | G06F 16/90339 |
| 2023/0068120 | A1* | 3/2023 | Van Lunteren | G06F 9/3001 |
| 2023/0135619 | A1* | 5/2023 | Briancon | G06N 20/20 706/12 |

(Continued)

OTHER PUBLICATIONS

Chen et al.; Efficient Realization of Decision Trees for Real-Time Inference; ACM Transactions on Embedded Computing Systems, vol. 21, No. 6, Article 68. Publication date: Oct. 2022 (Year: 2022).*

(Continued)

*Primary Examiner* — Corey S Faherty
(74) *Attorney, Agent, or Firm* — Steven M. Bouknight

(57) ABSTRACT

Methods are provided for inference processing of a decision tree model in processing apparatus which executes vector instructions to perform inference computations on vectors of operands stored in vector registers of the apparatus. Such a method includes, for each decision tree of the model, indexing nodes of the tree by consecutive node indexes which are assigned to nodes in a breadth-first order and increase with node-depth in the tree. During the inference processing, a vector of N node indexes, corresponding to a set of nodes for which N inference computations will be performed in parallel, is stored in a vector register of the apparatus. The method further includes adaptively selecting the granularity N of the vector of node indexes, in dependence on (at least) the node-depth of nodes in the set, to accelerate inference processing of the model.

20 Claims, 12 Drawing Sheets

(56) References Cited

U.S. PATENT DOCUMENTS

2024/0135483 A1* 4/2024 Wang .................. G06T 1/20

OTHER PUBLICATIONS

Grace Period Disclosure, "Release Notes", Snap MLRelease V1.9.3, Sep. 9, 2022, https://snapml.readthedocs.io/en/latest/release_notes.html#/snap-ml-v1-9-3-sep-9-2022, 9 pages.

Kaggle, "Kaggle's State of Data Science and Machine Learning 2019", Enterprise Executive Summary, https://www.kaggle.com/kaggle-survey-2019, 2019 edition, 23 pages.

Lettich et al., "Parallel Traversal of Large Ensembles of Decision Trees", © 2018 IEEE, pp. 1-15.

Owaida et al., "Scalable Inference of Decision Tree Ensembles: Flexible Design for CPU-FPGA Platforms", Published in: 2017 27th International Conference on Field Programmable Logic and Applications (FPL), Date of Conference: Sep. 4-8, 2017, 10 pages.

Tracy, "Accelerating Decision Tree Ensemble Inference with an Automata Representation", A Dissertation Presented to the Graduate Faculty of the University of Virginia in Candidacy for the Degree of Doctor of Philosophy, University of Virginia, Aug. 2019, 140 pages.

Ye et al. "RapidScorer: Fast Tree Ensemble Evaluation by Maximizing Compactness in Data Level Parallelization", Applied Data Science Track Paper, KDD 2018, Aug. 19-23, 2018, London, United Kingdom, pp. 941-950.

* cited by examiner process trees in parallel process input samples in parallel hybrid processing hybrid processing

INFERENCE PROCESSING OF DECISION TREE MODELS USING VECTOR INSTRUCTIONS

The following disclosure(s) are submitted under 35 U.S.C 102(b)(1)(A):

DISCLOSURE(S): Snap ML library for Machine Learning. IBM Research, copyright IBM Research, Release notes: Snap ML v1.9.3 (Sep. 9, 2022) Release, IBM, Sep. 9, 2022, webpage: https://snapml.readthedocs.io/en/latest/release_notes.html#snap-ml-v1-9.

BACKGROUND

The present invention relates generally to accelerating inference processing of decision tree models using vector instructions. Methods are provided for inference processing of decision tree models in processing apparatus which executes vector instructions on operands stored in vector registers, together with computer program products implementing such methods.

Decision tree models are important machine learning tools and are widely used in cognitive computing tasks due to their inherent simplicity and interpretability. A decision tree is a logical tree-like structure comprising nodes and branches, where nodes have associated attributes which are used to make a series of decisions to obtain an inference result for an input data sample. The inference processing starts at an initial ("root") node of the tree, evaluating a node attribute in relation to a specified feature of the input sample to decide which branch to follow to the next ("child") node. The decision process is repeated at each node as the tree is "walked" for the sample until an end ("leaf") node is reached which indicates a result for that sample. This result may represent a particular category to which the input sample is assigned (classification) or a value for the sample on some predefined scale (regression). Decision tree models, such as Random Forests and Gradient Boosting models, may employ an ensemble (e.g., hundreds or thousands) of decision trees from which the individual results are further processed to produce the final inference result for an input sample.

Inference processing over large batches of input samples and/or large numbers of trees can be time and resource intensive. Parallel processing techniques, such as SIMD (Single Instruction, Multiple Data), which use vector instructions to operate on multiple data points in parallel can assist in this process. Vector instructions operate on vectors of operands stored in vector registers of a processing unit which performs the same computation on all operands of such a vector in parallel.

SUMMARY

A first aspect of the present invention provides a method for inference processing of a decision tree model in processing apparatus which executes vector instructions to perform inference computations on vectors of operands stored in vector registers of the apparatus. The method includes, for each decision tree of the model, indexing nodes of the tree by consecutive node indexes which are assigned to nodes in a breadth-first order and increase with node-depth in the tree. During the inference processing, a vector of N node indexes, corresponding to a set of nodes for which N inference computations will be performed in parallel, is stored in a vector register of the apparatus. The method further comprises adaptively selecting the granularity N of the vector of node indexes, in dependence on (at least) the node-depth of nodes in the set, to accelerate inference processing of the model.

Another aspect of the invention provides a computer program product comprising a computer readable storage medium embodying program instructions, executable by a processing apparatus, to cause the processing apparatus to implement such a method.

Embodiments of the invention will be described in more detail below, by way of illustrative and non-limiting example, with reference to the accompanying drawings.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Methods embodying the invention perform inference processing of a decision tree model, which may include one or more decision trees, to provide inference results for one or more input data samples.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
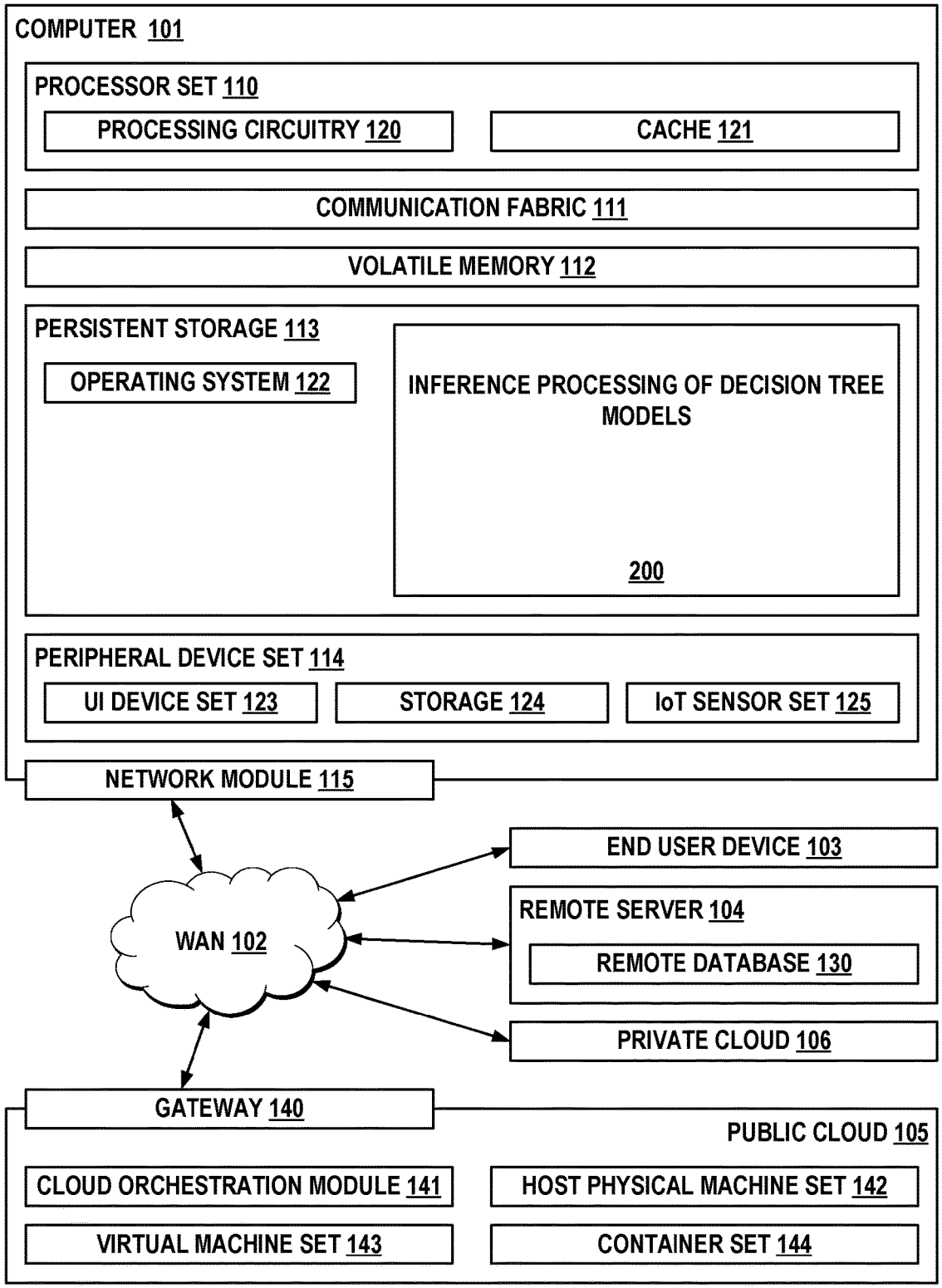
FIG. 1 is a schematic representation of a computing system for implementing methods embodying the invention.

Referring now to FIG. 1, a computing environment 100 is illustrated, according to an embodiment.

Computing environment 100 contains an example of an environment for the execution of at least some of the computer code involved in performing the inventive methods, such as Inference Processing of Decision Tree Models 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments to be described can be performed as computer-implemented methods for accelerating inference processing of decision tree models. Such methods may be implemented by a computing system comprising one or more general-purpose or special-purpose computers, each of which may include one or more (real or virtual) machines, providing functionality for implementing operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

Figure 2:
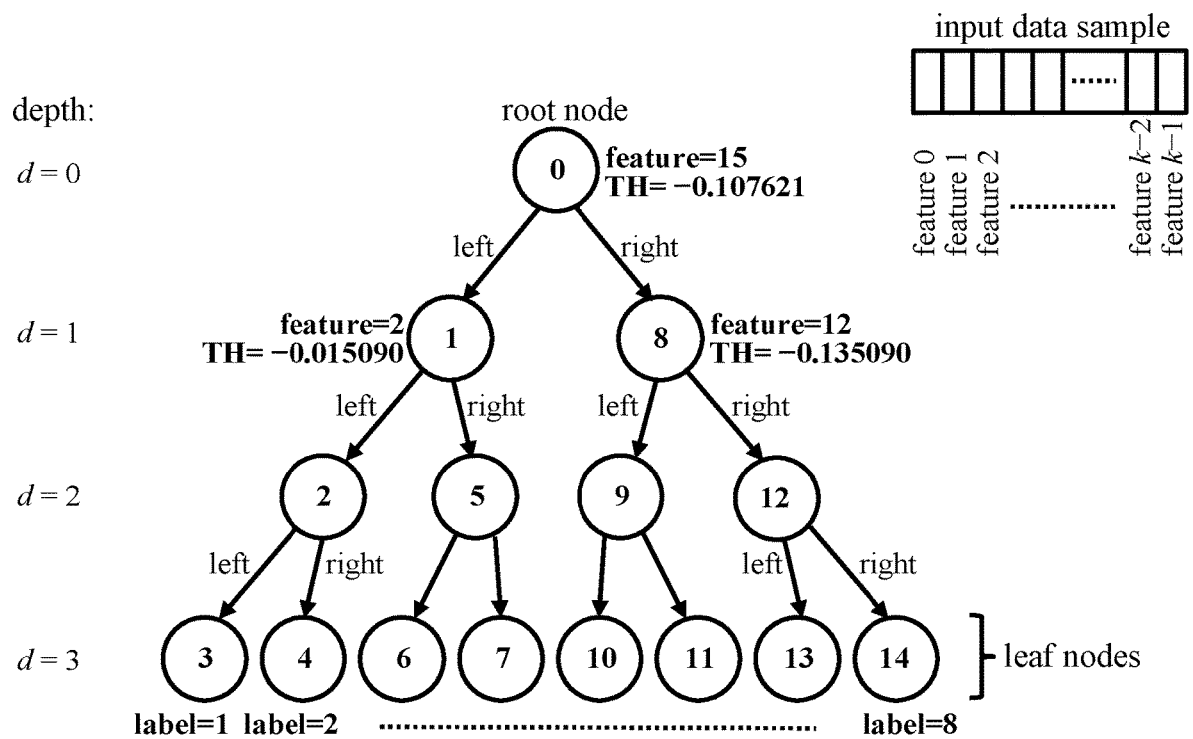
FIG. 2 shows logical structure of a simple decision tree.

The FIG. 2 schematic shows an example of a simple decision tree to be processed for an input data sample with k data features, labeled 0 to k−1, according to an embodiment. The nodes (represented by circles) of this binary decision tree are linked via branches (represented by arrows) from the initial root node to the final leaf nodes of the tree. Each node is indexed by a unique node index as indicated here by decimal numbers in the circles. Each node (except leaf nodes) has an associated set of attributes which indicate the operands used to evaluate that node in the inference process. In this example, as illustrated for the first three nodes of the tree, each node has a feature attribute specifying the particular feature, 0 to k−1, of the input sample to be used in the evaluation, and a threshold attribute TH defining a threshold for the evaluation. An inference computation for evaluating a node compares the specified input feature (represented by a number) with the defined threshold TH. If the input feature is less than TH then the process branches to the left child node. Otherwise, the process branches to the right child node. Processing starts with the root node and branches to successive child nodes, at increasing node-depth d in the tree, as the tree is walked until a leaf node is reached, here at d=3. Each leaf node has an associated label (labels 1 to 8 here) which indicates a result for an input sample. Labels may correspond to predefined classes to which the sample is assigned in a classification task, or a predefined value/range assigned to the sample in a regression task.

Figure 3:
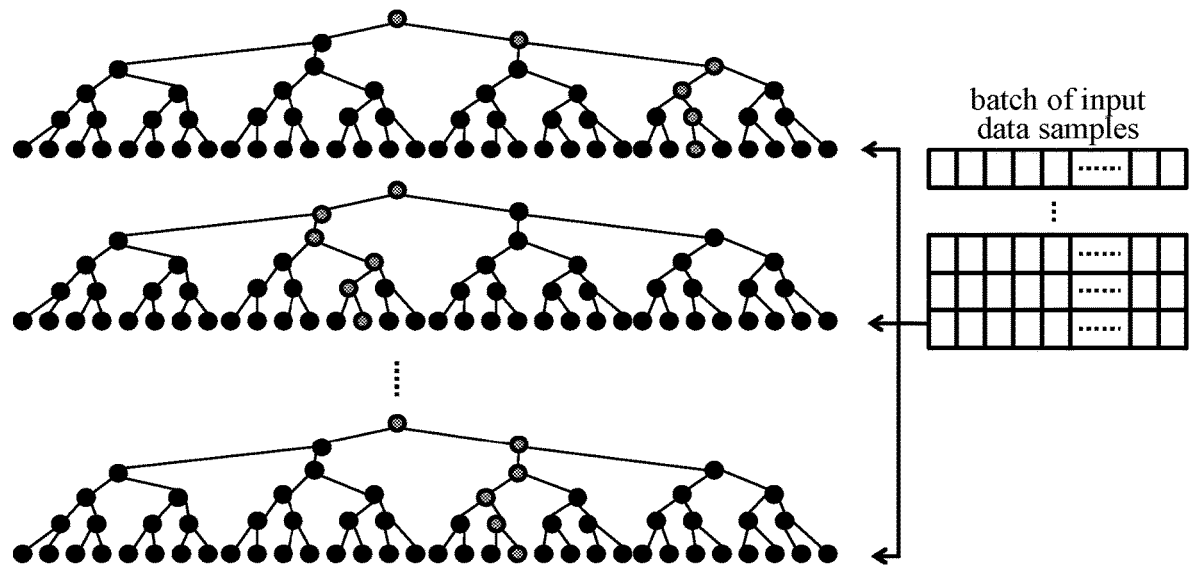
FIG. 3 illustrates parallel processing of decision trees for input data samples.

While a simple example is shown in FIG. 2, in practice decision trees may have many more levels (much greater depth d) and evaluation of nodes may involve various other computations. For example, instead of simple threshold comparisons, node evaluation may involve identity, or range, comparisons as is well known in the art. Also, tree-based models, such as Random Forests and Gradient Boosting models, include an ensemble (often thousands) of decision trees for a given application. A batch of input samples is supplied in a prediction request, where the batch-size (i.e. number of samples in the batch) may vary from one request to another. Parallel processing techniques can be exploited to process multiple trees of the ensemble in parallel for the input samples. This is illustrated schematically in FIG. 3 where the grey nodes mark walks through individual trees for a given input sample, according to an embodiment. For each sample, the individual results from all trees of the model are merged to obtain the final inference result for the sample. This merge operating may involve calculating an average over the individual results (e.g., in a regression task) or adding the individual results together (e.g., in a classification task if these results comprise class probabilities) or by using the individual results in a majority vote (e.g., in a classification task if these results involve predicted classes).

Many modern processors support parallel processing based on vector instructions, such as SIMD (Single Instruction, Multiple Data), which operate on multiple data points in parallel. Vectors of such data points can be stored in vector registers of the processor which, by executing a vector instruction, performs a particular computation on all data points of a vector in parallel. This concept is illustrated schematically in FIG. 4 for a SIMD unit with 4-way parallelism, according to an embodiment. The vector registers of this unit can store vectors of four elements (operands) of equal bit-width. A typical SIMD operation stores two vectors, vector 1 and vector 2 in the figure, in respective registers and operates element-wise on these vectors to produce a result vector as illustrated. The same computation, here an operation O, is thus performed on four pairs of operands in parallel to produce respective elements of the result vector. Such vector instruction based processing can be exploited for parallel processing of decision tree models. For example, four decision trees like that of FIG. 2 could be processed in parallel in the FIG. 4 architecture. For these trees, four nodes, one from each tree may be evaluated by a single vector instruction. The four thresholds TH for these nodes form the operands of an "attribute vector" stored as vector 1 in FIG. 4. The four data features for these nodes form corresponding operands of a "feature vector" stored as vector 2. The 4-way parallel operation O performs the element-wise comparison of these vectors to generate the result vector whose elements indicate the individual comparison results, e.g. "true" (all binary 1's) if the feature is less than TH, or "false" (all binary 0's) otherwise.

The overall degree of parallelism for inference processing of a model depends on available processing resources such as the number of processing cores in each CPU/GPU of a processing apparatus and the number of threads supported by each core, as well as the bit-widths of vector registers and the data-types used for node and feature data. Current CPU's typically use 128-bit, 256-bit or 512-bit vector registers, respectively allowing storage of 4-element, 8-element or 16-element vectors of 32-bit operands, e.g., single-precision floats, 32-bit integers, etc.

Figure 5:
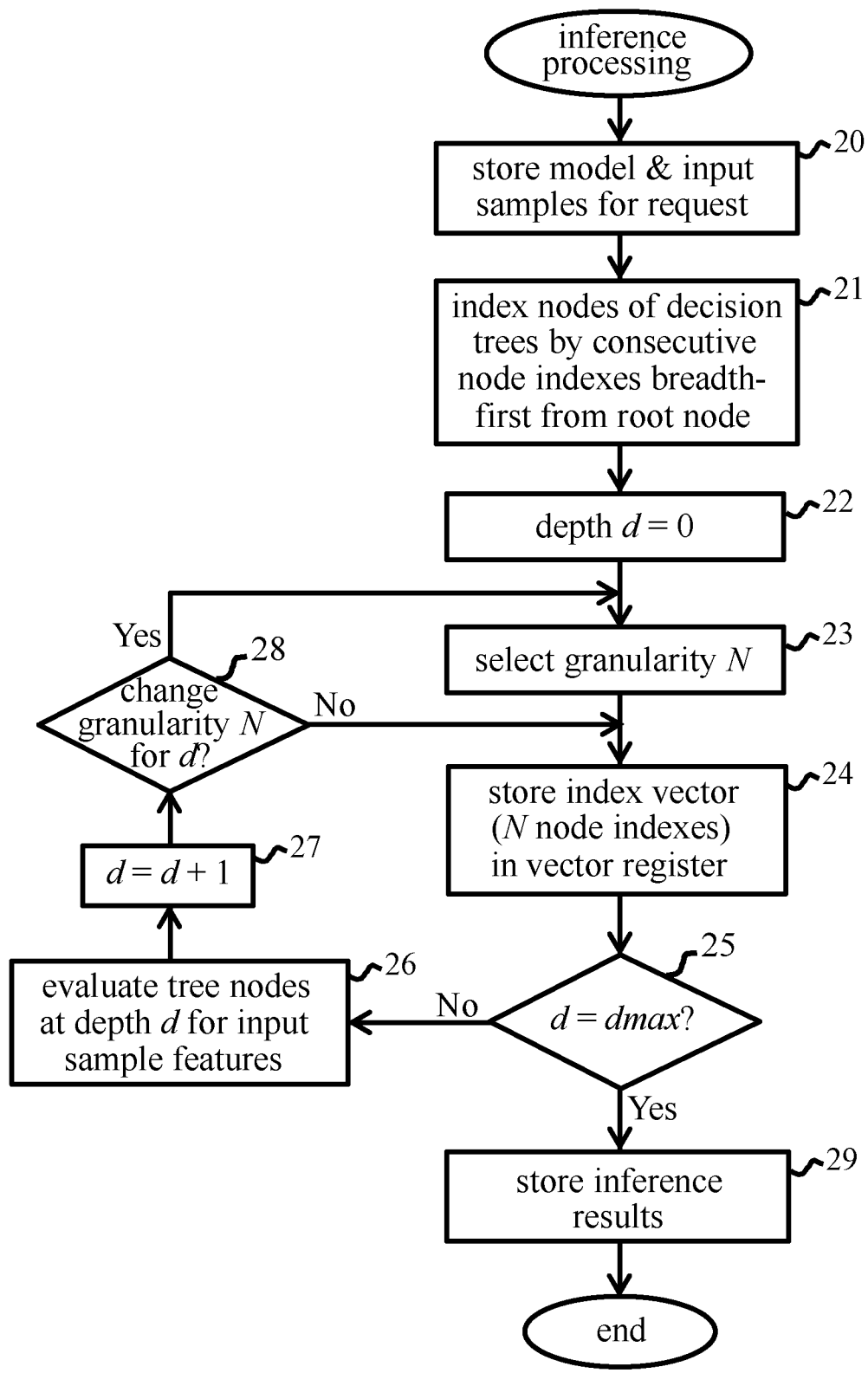
FIG. 5 indicates steps of a method embodying the invention for accelerating inference processing of decision tree models.

FIG. 5 indicates basic steps of a method embodying the invention for inference processing of a decision tree model. Steps of this method can be implemented by processing apparatus of a computing system, such as processing unit 2 of computer 1 in FIG. 1, which executes vector instructions to perform computations on vectors of operands stored in vector registers of the apparatus. Step 20 represents storage in system memory 3 of the tree data structures for the model to be processed, along with the input data sample(s) for a prediction request. Step 21 represents an indexing step which is implemented for each decision tree of the model. This step involves indexing nodes of each tree by consecutive node indexes which are assigned to nodes in a breadth-first order, and increase with node-depth in the tree, as explained below. At the start of inference processing, a depth counter d is initialized to 0 (root node-depth) as indicated by step 22. In step 23, processing unit 2 selects an initial granularity N for an "index vector" used in subsequent processing steps. This index vector is a vector of N node indexes corresponding to a set of nodes for which N inference computations will be performed in parallel. (This set of nodes may comprise nodes from one or more decision trees as discussed further below). The initial value of the vector granularity N can be selected based on various criteria explained below. For the start of inference processing, the index vector is initialized with N root node indexes. In step 24, the index vector is stored in a vector register of processing unit 2.

A breadth-first order includes searching a tree data structure for a node which satisfies a given property, starting at a tree root and exploring all nodes at a present depth before moving to nodes at a next depth level.

In decision step 25, the processing unit decides if a maximum processing depth $d_{max}$ has been reached. For the purpose of this example, $d_{max}$ is the leaf node depth which is assumed to be equal for all decision trees in the model. If not, operation proceeds to step 26. Here, the processing unit 2 evaluates the tree nodes corresponding to each node index in the index vector. This step involves loading attribute and feature vectors to vector registers, and performing parallel inference computations to generate result vectors, as described further below. The depth counter is then incremented in step 27 for the next processing level, and operation proceeds to decision step 28. Here, the processing unit decides, based on the new processing depth d, whether the granularity N should be changed for the next round of inference computations. The particular depth(s) at which granularity is changed may depend on various criteria explained below. If no change is required, operation reverts to step 24 and a new index vector, with the same granularity as before, is stored in a vector register of processing unit 2. This index vector contains the child node indexes for the next processing level as indicated by the result vector(s) from evaluation step 26. Preferred embodiments can efficiently compute this child index vector from the results vector(s) as described below. If the decision is "Yes" at step 28, then operation reverts to step 23 and a new granularity N is selected based on the current value of d, and operation proceeds to step 24. The process thus iterates, performing successive rounds of parallel inference computations in step 26, until $d=d_{max}$ at decision step 25. At this point, the inference results are stored in step 29 and the process terminates.

The inference results stored in step 29 indicate the leaf labels for the particular input data sample(s) and decision tree(s) processed in the inference process above. Multiple such processes may be performed, in parallel and/or serially depending on resource availability, until all trees in the model have been processed for all input samples in the prediction request. The final inference result for each sample is then generated using the results from all trees as described above, and is output to the user.

Figure 6:
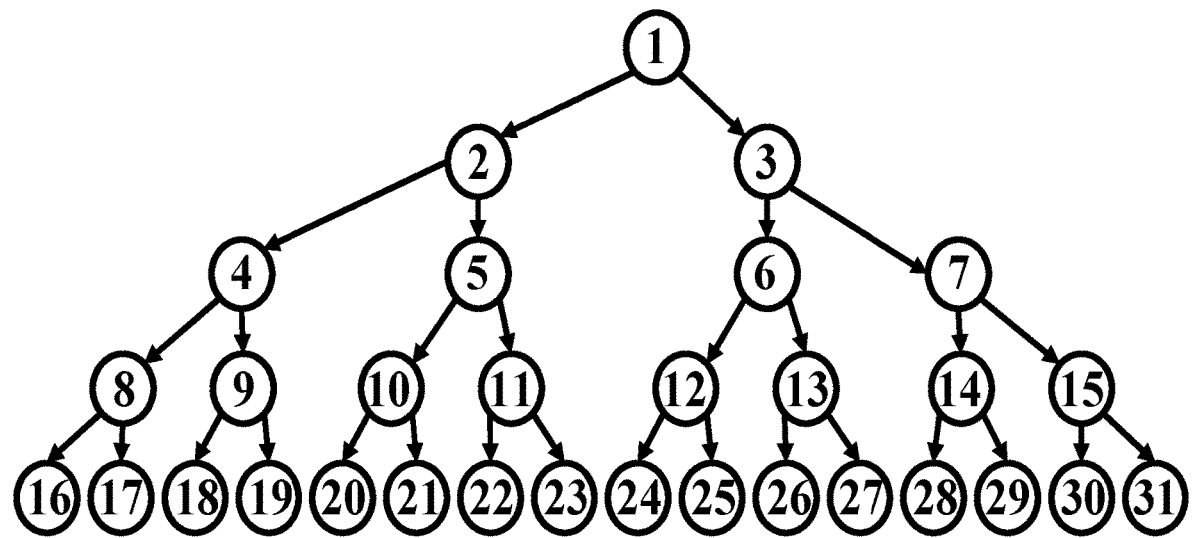
FIG. 6 shows a node indexing system used in the FIG. 5 method.

FIG. 6 shows an example of the indexing system (step 21 of FIG. 5), here for a binary decision tree with $d_{max}=4$. (Indexes, indicated in decimal here, are defined by binary strings in practice). It can be seen that consecutive indexes are assigned to nodes in a breadth-first order (i.e. in order of breadth before depth) starting from the root node. In preferred embodiments, as here, the root node has a node index of value 1. With this indexing system, it can be seen that the index of each left child node=twice the parent node index. The index of each right child node=twice the parent node index+1. This system allows highly efficient calculation of child node indexes, even across multiple processing granularities, as described further below. The indexing system is conveniently implemented by mapping nodes of each tree data structure on consecutive offsets in memory. That is, if the tree data structure is defined by a string of fixed-width data segments representing, e.g., Tree Identifier; Node1 data; Node2 data; and so on, then the node index corresponds to the number of segments by which a given node is offset from the start of that data structure. This system eliminates the need to store node indexes explicitly in tree data structures.

With the indexing system of FIG. 6, node indexes for nodes at depths d=0 to d=7 range from decimal 1 to 255 and can be encoded as 8-bit strings. Nodes at depths d=8 to d=15 range from decimal 256 to 65535 and can be encoded by 16-bit strings. Nodes at depths d=16 to d=31 can be encoded by 32-bit strings. (Note that $d_{max}$ is typically <32 for decision tree models. Deeper trees would need a different approach to avoid exploding memory size.)

The granularity N selected in successive passes of step 23 of FIG. 5 depends on the width of vector registers in processing unit 2 as well as the number of bits required to encode node indexes, and hence on the processing depth d. An exemplary implementation of this process is illustrated in more detail in FIGS. 7a through 7c. This example assumes that vector registers have a width W of 128 bits, node attributes/input sample features use a 32-bit data type, and inference computations involve threshold comparisons as described with reference to FIG. 2.

Figure 7A:
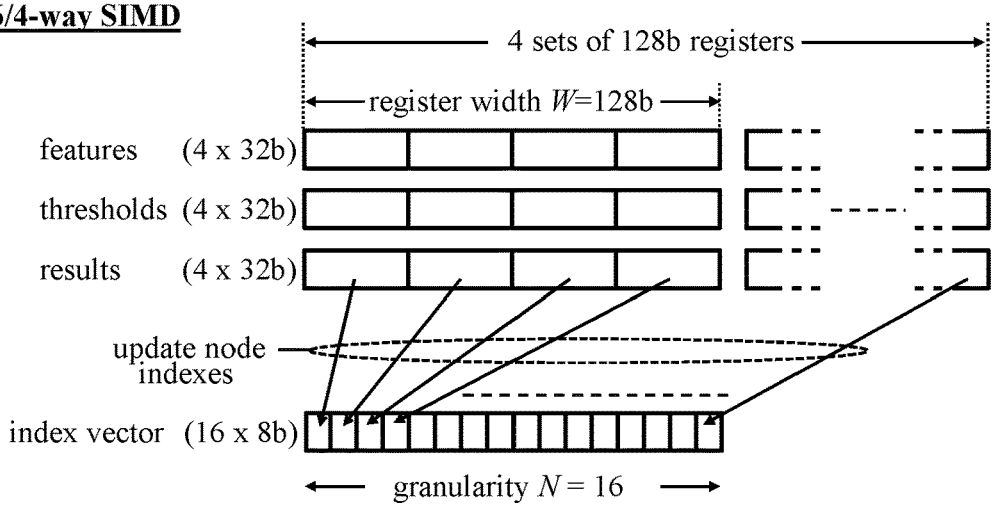
FIGS. 7a through 7c illustrate operation of the FIG. 5 method in an exemplary implementation.

FIG. 7a illustrates parallel inference computations using these registers for node-depths d=0 to d=7. Sixteen inference computations can be performed in parallel using four sets of 128-bit registers as illustrated. Each set of registers stores one feature vector, with four 32-bit feature elements, and a corresponding threshold vector, with four 32-bit thresholds. A third register in each set stores the result vector, each with four result elements dependent on element-wise comparison of the feature vector and threshold vector. Result elements here are either "true" (all binary 1's) if the feature element is less than the threshold, or "false" (all binary 0's) otherwise.

The index vector here has N=16 8-bit elements each encoding one node index. In the arrangement shown, the first four indexes define the parent nodes for the element-wise computations in the first register set. Subsequent groups of four indexes define the parent nodes for computations in the other three register sets. For node-depths 0 to 6, the indexes in this vector are updated, without changing the granularity N (step 28 of FIG. 5) depending on the corresponding result element: true=left child node index; false=right child node index. A preferred implementation for the node index update computations is described in detail below.

Figure 7B:
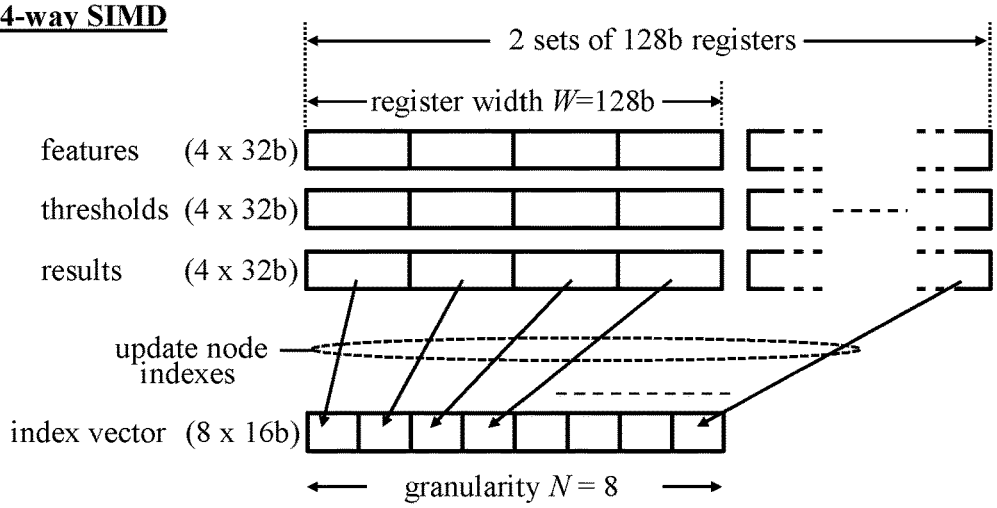
Figure 7C:
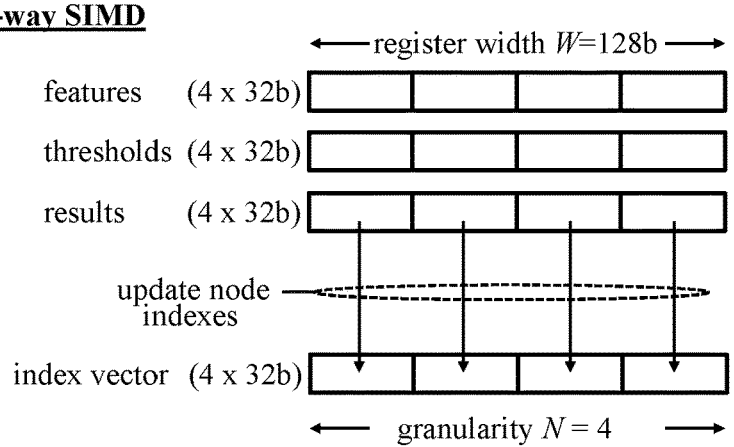

When inference computations have been performed (step 26 of FIG. 5) for parent nodes at depth 7, the granularity will be changed for the next level, d=8, in decision step 28. The granularity then selected in step 23 is N=8. Each of two index vectors for the level 8 processing then stores eight 16-bit indexes. This is shown in FIG. 7b for one of the resulting index vectors. The indexes in this vector define the parent nodes for eight inference computations in two sets of registers. Operation then proceeds, without changing the granularity, until d=16 at step 27 of FIG. 5. The granularity N is then further changed to N=4. Each (8×16-bit) index vector from the previous processing level is then updated to produce two index vectors, each with four 32-bit elements, one of which is shown in FIG. 7c. This vector defines the parent nodes for four inference computations in a single register set as illustrated. Operation then continues, without further change in granularity N, with one (4×32-bit) index vector being updated via computations in each of the four initial register sets.

Figure 8:
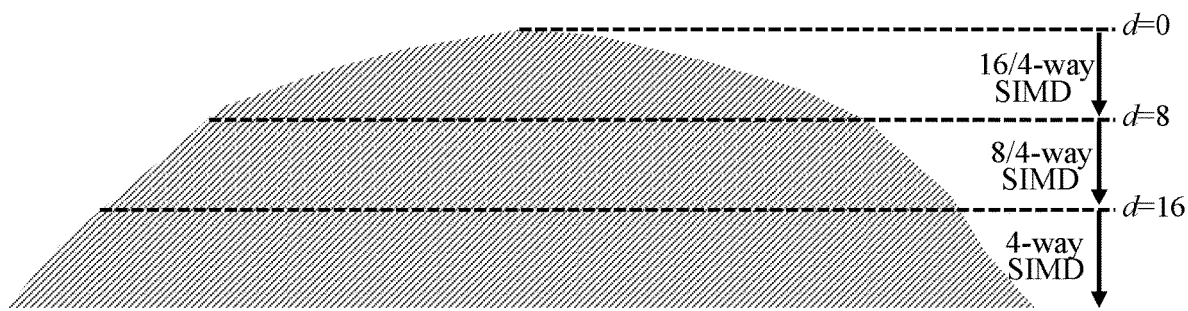
FIG. 8 illustrates variation of parallel processing granularity with node depth in the exemplary implementation.

The above implementation is illustrated schematically in FIG. 8, according to an embodiment. The FIG. 7a scheme ("16/4-way SIMD") is performed at node-depths 0 to 7. The FIG. 7b scheme ("8/4-way SIMD") is performed at node-depths 8 to 15, and the FIG. 7c scheme ("4-way SIMD") is performed at node-depths 16 to 32. By adaptively selecting the granularity N based on processing depth, this implementation allows SIMD to be exploited for processing decision tree models with the maximum possible degree of parallelism, based on register width and data type, for a given processing depth d. This provides maximum processing efficiency, significantly reducing latency of the inference processing.

While operation has been described for W=128-bit registers, the same principles can be applied for other register sizes, e.g., W=256 or 512. With W=256, for example, thresholds/features can be processed as 32-bit floats using 8-way SIMD instructions operating on 256-bit vectors throughout the entire tree-depth. Node indexes can be processed as 8-bit, 16-bit or 32-bit integers using 32-way, 16-way or 8-way SIMD instructions operating on 256-bit registers depending on processing depth d as before.

Various other combinations of two or more of 16/4-way, 8/4-way and 4-way SIMD can be used to accelerate inference processing. For example, for models with $d_{max}<16$, only 16/4-way and 8/4-way SIMD can be used. For models with $d_{max}>16$, and vector registers of width W, granularity N may be selected such that such that W/N=8 for 0≤d≤7 (16/4-way SIMD) and W/N is one of 16 and 32 for 8≤d≤15 (i.e. either one of 8/4-way and 4-way SIMD for all d≥8). Alternatively, for $d_{max}>16$, W/N=16 (8/4-way SIMD) may be used for all d≤15, with 4-way SIMD for deeper levels. Typically, however, switching between 16/4-way, 8/4-way and 4-way SIMD as shown in FIG. 8 provides optimized latency.

Operation has been described above in relation to fully populated decision trees whereby all leaf nodes are at the same depth $d_{max}$. Various techniques can be applied to accommodate trees which are not fully populated. For example, adaptive switching between different values of N may be applied only for parallel processing of (one or more) trees down to a depth corresponding to the minimum leaf depth in these tree(s). However, various other techniques will be apparent to those skilled in the art. For example, trees may be artificially expanded to extend all possible paths through the trees to a common level $d_{max}$. This may be achieved by detecting leaf nodes at a lower level than $d_{max}$ and effectively "inserting" copies of the parent node repeatedly, at that level and all subsequent levels, down to the leaf node at $d_{max}$.

Figure 4:
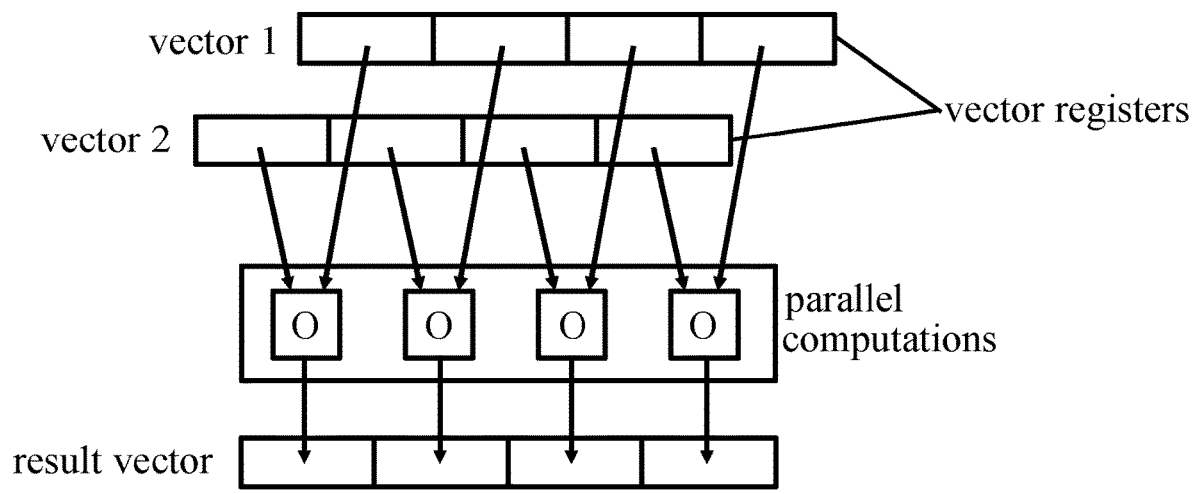
FIG. 4 illustrates parallel computations in a processor executing vector instructions.
Figure 9A:
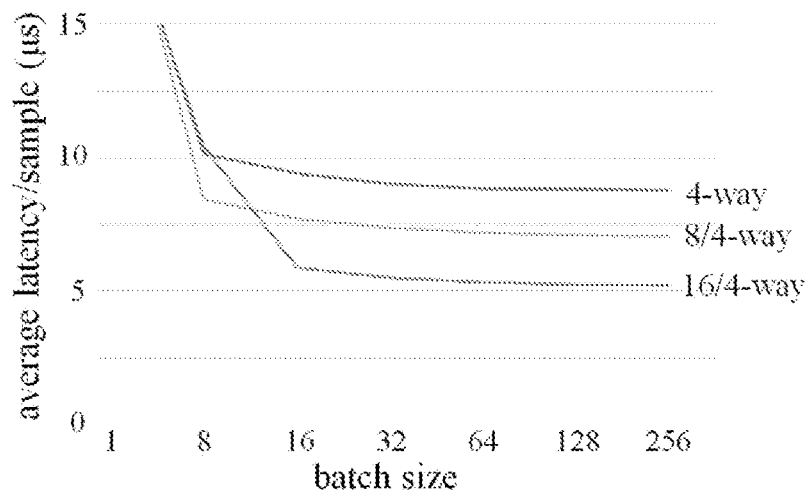
FIGS. 9a through 9c show variation of inference latency with input sample batch-size in exemplary applications with various parallel processing granularities.
Figure 9B:
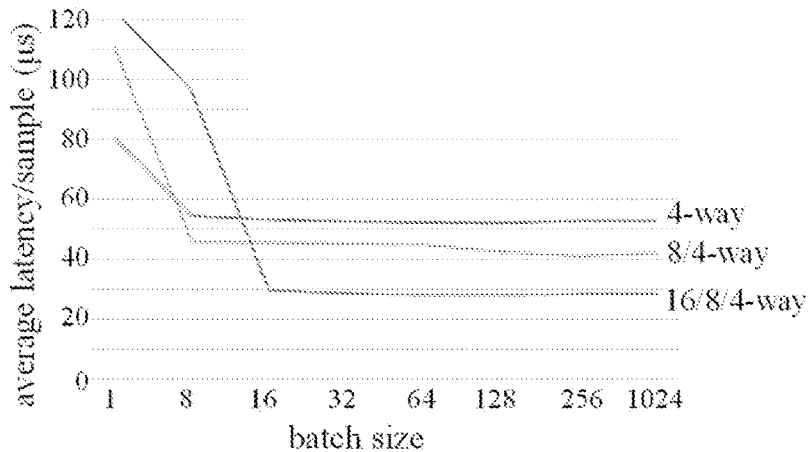
Figure 9C:
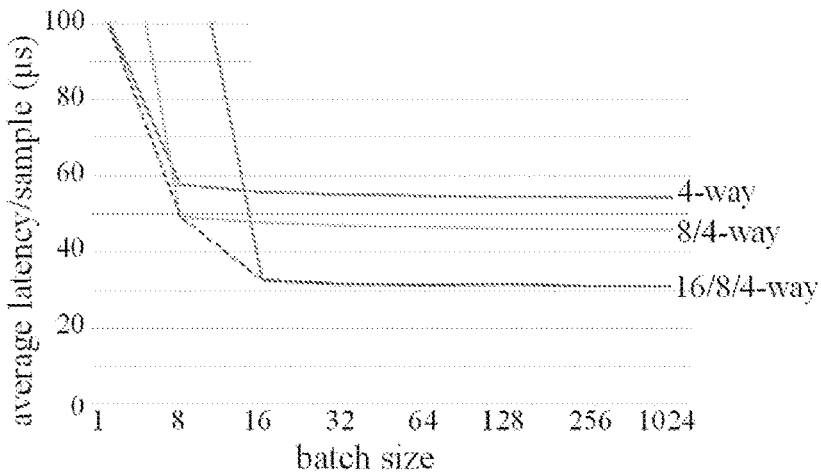

The adaptive selection of N may also depend on batch size in some embodiments, e.g. for applications where inference processing is performed for variably-sized batches of input data samples. FIGS. 9a through 9c show how average inference latency for input samples varies with batch size for respective inference applications, according to an embodiment. FIG. 9a shows latency plots using 4-way, 8/4-way and 16/4way SIMD for inference on an application model with 1000 trees and $d_{max}=4$, according to an embodiment. It can be seen that 8/4-way SIMD has lowest latency for batch sizes less than 12. FIGS. 9b and 9c show similar plots for two different application models with 1000 trees and $d_{max}=12$, each according to an embodiment. The traces labeled "16/8/4-way" were obtained using 16/4-way SIMD at levels 0 to 7 and 8/4-way SIMD at deeper levels. In both figures it can be seen that 8/4-way SIMD beats 16/4-way SIMD for a range of small batch sizes. In FIG. 9b, 4-way SIMD offers lowest latency for the smallest batches. By testing a given model for different batch-sizes, therefore, particular batch size thresholds can be identified for switching between different parallel processing granularities N to achieve the lowest latency. Preferred methods can exploit this technique to adaptively select the granularity N in dependence on size of each batch of input samples. For example, with the FIG. 9b model, 4-way SIMD (N=32 in the FIG. 9c example) may be used for batch sizes less than 8, and 8/4-way SIMD used for batch sizes between 8 and 15. For higher batch sizes, adaptive switching between 16/4-way and 8/4-way SIMD based on node-depth can be implemented as described above. A similar technique can be implemented for the FIG. 9c model, resulting in optimized latency for all batch sizes as indicated by the dotted trace in this figure. In general, therefore, the adaptive selection of N based on node-depth may be applied for some or all batches of input data samples, e.g. only for batches above a predetermined threshold size. Below this threshold, adaptive selection of N can be based on batch size only.

Figure 10A:
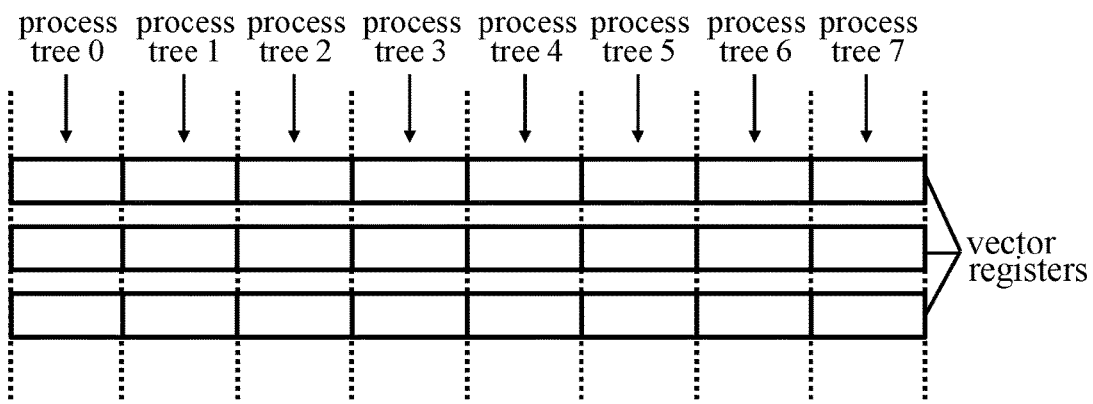
FIGS. 10a and 10b illustrate use of vector registers of a processing apparatus in different parallel processing schemes.
Figure 10B:
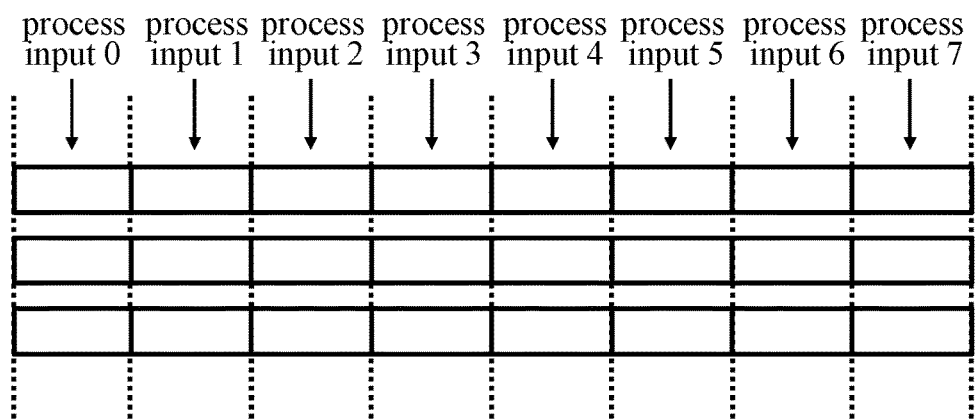
Figure 11A:
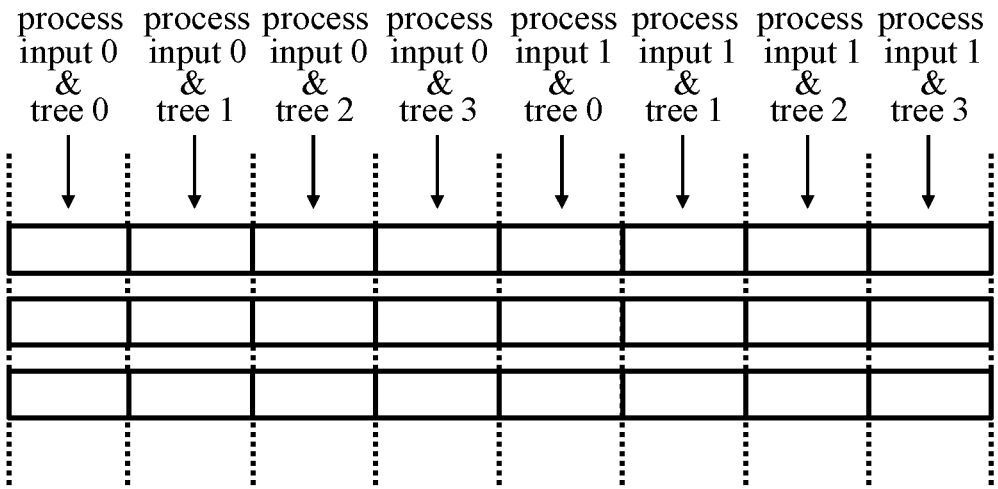
FIGS. 11a and 11b show further examples of use of vector registers in parallel processing schemes.
Figure 11B:
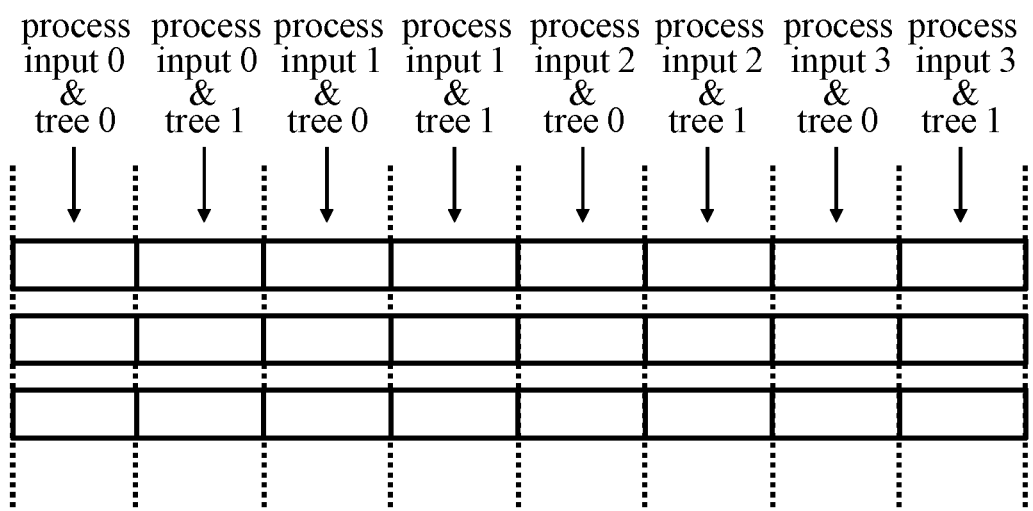

The parallel processing operations of FIGS. 7a through 7c may be used for processing one or more decision trees and/or one or more input samples in parallel. FIG. 10a illustrates the allocation of register locations to inference operands in an exemplary operation with 256-bit registers storing eight 32-bit vector elements, according to an embodiment. Each "column" of corresponding elements in these registers is used for inference computations on a different decision tree and the same input sample. In the opposite configuration of FIG. 10b, each column of elements is used to process a different input sample but the same decision tree, according to an embodiment. For a given granularity N, therefore, an index vector may contain node indexes for nodes of up to N different trees to be processed in parallel (in one or more sets of registers). Alternatively, the index vector may contain node indexes for nodes of a single decision tree for which N inference computations, corresponding to respective input data samples, will be performed in parallel. Various "hybrid" processing schemes can also be envisaged. FIGS. 11a and 11b show two such examples, each according to an embodiment. FIG. 11a shows a register allocation for processing two different input samples and four decision trees in parallel. FIG. 11b shows an allocation for processing four input samples on two decision trees in parallel. Hence, where a plurality of input samples are provided in a prediction request, an index vector may comprise node indexes for nodes of P decision trees for each of which Q inference computations, corresponding to respective input data samples, will be performed in parallel, where PQ=N. For the hybrid schemes of FIGS. 11a and 11b, 1<P<N. Selection of particular values for Q may be performed adaptively in some embodiments, e.g. based on size of each batch (as well as processing depth d), with optimal register allocation being determined by testing for various batch sizes.

Figure 12:
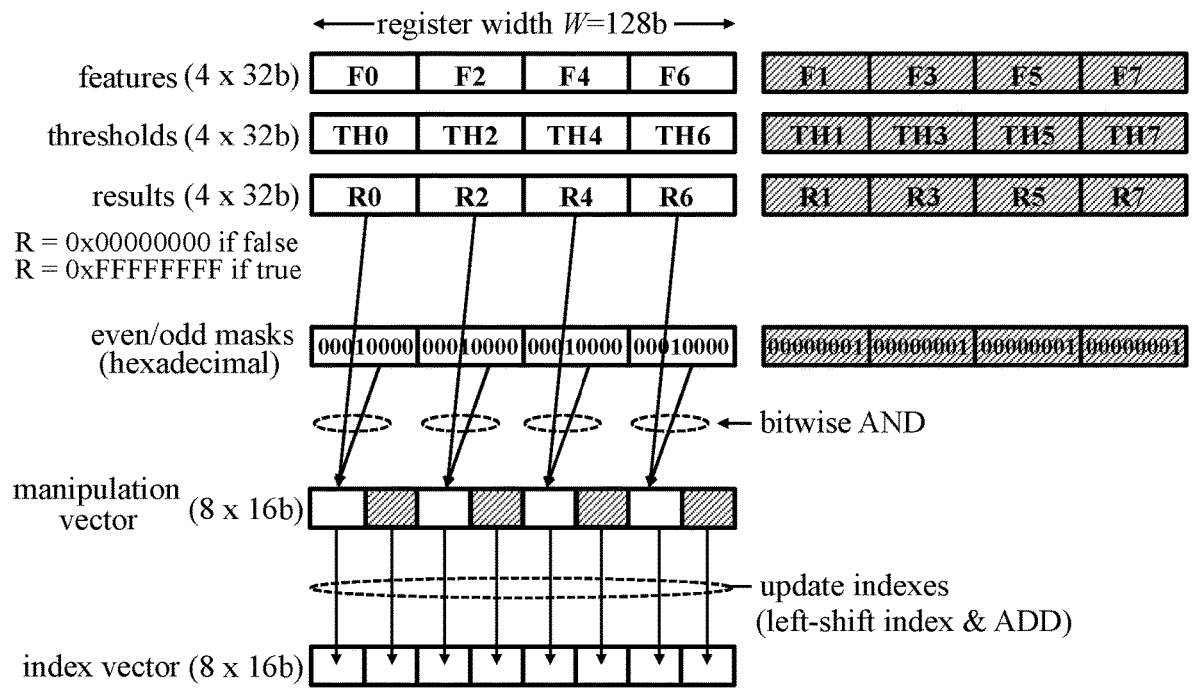
FIG. 12 illustrates use of manipulation vectors for updating node indexes in an implementation of the FIG. 5 method.

A preferred technique for updating index vectors during inference processing will now be described with reference to FIG. 12, according to an embodiment. This figure illustrates the update technique in relation to the 8/4-way SIMD configuration of FIG. 7b. The two register sets store features F0 through F7, thresholds TH0 through TH7, and corresponding comparison result elements R0 through R7. The first register set (no shading in the figure) stores feature/attribute/result vectors each comprising the M=4 elements with even-numbered labels. The second register set (shaded grey) stores similar vectors each comprising the M=4 elements with odd-numbered labels.

When (as for the 8/4-way SIMD configuration shown) the selected granularity N of the index vector is greater than M, the index update operation uses a "manipulation vector" having N elements generated by masking respective result elements of a plurality of result vectors (here the two result vectors). An element of these result vectors is (hexadecimal) FFFFFFFF if the comparison result is true, or 00000000 if the result is false. The masking operation uses an "even mask" for the first register set and an "odd mask" for the second register set. Each mask comprises four 32-bit elements with hexadecimal values as indicated in the figure. A bit-wise AND between the even mask and the even result vector produces four 16-bit elements of the manipulation vector indicated by the white segments in the figure. Each of these segments has a "1" at the least-significant bit (LSB) position if the corresponding result element is true, or a "0" at the LSB position if the result element is false. Similarly, bit-wise AND between the odd mask and the odd result vector produces four 16-bit elements of the manipulation vector, indicated by shaded segments in the figure, with an LSB of "1" or "0" for true or false results respectively.

The index vector here contains eight 16-bit indexes for the parent nodes which were evaluated to produce the result elements R0 through R7. These node indexes can be updated to obtain the correct child node indexes for the next stage of inference processing by computing an element-wise combination of the manipulation vector and the index vector. In particular, each index in the index vector is first left-shifted by one bit (effectively doubling the parent node index). The manipulation vector is then added bit-wise to the resulting vector. Alternatively, a bitwise OR may be performed here with the same effect. That is, if the corresponding element (white or grey segment) of the manipulation vector has an LSB of "0", the corresponding updated index in the index vector will be that of the left child node (twice the parent node index). If the LSB is "1", the updated index will be that of the right child node (twice the parent node index+1).

When granularity of the index vector changes during inference processing, granularity of the mask and manipulation vectors can be changed accordingly. The use of manipulation vectors and even/odd vector elements as described thus provides an elegantly simple index update operation supporting efficient transfer between different granularities when required during inference processing. When the index vector granularity N is the same as the number M of elements in the feature and attribute vectors, index updates can be performed via simple bit-wise AND between the result vector and a mask corresponding to the odd mask in FIG. 12.

It will be seen that the embodiments described offer accelerated inference processing of decision tree models through adaptive exploitation of vector instructions at multiple parallel granularities. However, many other changes and modifications may be made to the exemplary embodiments described. For example, node evaluation may involve computations other than simple threshold comparisons. Also, while embodiments can be implemented particularly efficiently for binary tree models, the same principles may be applied in operation of embodiments with non-binary trees.

In general, where features are described herein with reference to a method embodying the invention, corresponding features may be provided in a computer program product embodying the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for inference processing of a decision tree model in processing apparatus which executes vector instructions to perform inference computations on vectors of operands stored in vector registers of the processing apparatus, the method comprising:
   for each decision tree of the decision tree model, indexing nodes of the decision tree by consecutive node indexes which are assigned to nodes in a breadth-first order and increase with node-depth in the decision tree model;
   during the inference processing, storing a vector of N node indexes, corresponding to a set of nodes for which N inference computations will be performed in parallel, in a vector register of the processing apparatus; and
   adaptively selecting a granularity N of the vector of node indexes, in dependence on the node-depth of nodes in the set of nodes, to accelerate inference processing of the decision tree model.

2. The method according to claim 1 further comprising:
   adaptively selecting the granularity N of the vector of node indexes in dependence on node-depth of nodes in the set of nodes which optimize latency of the inference processing.

3. The method according to claim 1 for performing inference processing for variably-sized batches of input data samples, the method further comprising:

adaptively selecting the granularity N of the vector of node indexes in dependence on size of each batch.

4. The method according to claim 3 further comprising: adaptively selecting the granularity N of the vector of node indexes in dependence on node-depth of nodes in the set of node only for batches above a predetermined threshold batch-size.

5. The method according to claim 1 wherein the decision tree model comprises a plurality of decision trees and the vector of N node indexes comprises node indexes for nodes of N different trees.

6. The method according to claim 1 for performing the inference processing for N input data samples, wherein the vector of N node indexes comprises node indexes for nodes of a single decision tree for which N inference computations, corresponding to respective input data samples, will be performed in parallel.

7. The method according to claim 1 for performing the inference processing for a plurality of input data samples, wherein the decision tree model comprises a plurality of decision trees and the vector of N node indexes comprises node indexes for nodes of P decision trees for each of which Q inference computations, corresponding to respective input data samples, will be performed in parallel, where PQ=N.

8. The method according to claim 7 wherein 1<P<N.

9. The method according to claim 7 for performing the inference processing for variably-sized batches of input data samples, the method further comprising: adaptively selecting a value of Q in dependence on size of each batch.

10. The method according to claim 1 wherein a root node of each decision tree is indexed by a node index of value one.

11. The method according to claim 10 wherein the decision tree model comprises a binary decision tree model.

12. The method according to claim 11 wherein the vector registers have a width of W bits, the method further comprising adaptively selecting the granularity N in dependence on node-depth d of nodes in the set of nodes such that W/N=16 for 8≤d≤15 and W/N=32 for 16 d 31, where d=0 indicates depth of a decision tree root node.

13. The method according to claim 12 wherein W/N=8 for 0≤d≤7.

14. The method according to claim 11 wherein the vector registers have a width of W bits, the method further comprising adaptively selecting the granularity N in dependence on node-depth d of nodes in the set such that WIN=8 for 0≤d≤7, and W/N is one of 16 and 32 for 8 d≤15, where d=0 indicates depth of a decision tree root node.

15. The method according to claim 1 wherein the inference processing comprises processing feature vectors, each having M feature elements corresponding to respective features of input data samples, and attribute vectors, each having M attribute elements corresponding to respective attributes associated with nodes of the decision tree model, by:
storing a plurality of feature vectors in respective vector registers;
storing a plurality of attribute vectors in respective vector registers;
generating a plurality of result vectors, each comprising M result elements dependent on element-wise comparison of a feature vector and an attribute vector, and storing the plurality of result vectors in respective vector registers; and
when the selected granularity N of the vector of node indexes is greater than M, generating a manipulation vector, having N elements generated by masking respective result elements of the plurality of result vectors, and storing the manipulation vector in a respective vector register, and computing an element-wise combination of the manipulation vector and the vector of node indexes to update a respective node indexes for a next stage of the inference processing.

16. The method according to claim 15 wherein the decision tree model comprises a binary decision tree model and a root node of each decision tree is indexed by a node index of value one.

17. A computer program product for inference processing of a decision tree model in processing apparatus which executes vector instructions to perform inference computations on vectors of operands stored in vector registers of the apparatus,
the computer program product comprising:
one or more computer-readable storage media and program instructions stored on the one or more computer-readable storage media, the program instructions executable by a computing system to cause the computing system to perform a method comprising:
for each decision tree of the decision tree model, indexing nodes of the decision tree by consecutive node indexes which are assigned to nodes in a breadth-first order and increase with node-depth in the tree;
during the inference processing, storing a vector of N node indexes, corresponding to a set of nodes for which N inference computations will be performed in parallel, in a vector register of the processing apparatus; and
adaptively select a granularity N of the vector of node indexes, in dependence on the node-depth of nodes in the set of nodes, to accelerate inference processing of the decision tree model.

18. The computer program product according to claim 17, further comprising:
adaptively selecting the granularity N of the vector of node indexes in dependence on node-depth of nodes in the set of nodes which optimize latency of the inference processing.

19. The computer program product according to claim 17 for performing the inference processing for variably-sized batches of input data samples, the method further comprising:
adaptively selecting the granularity N of the vector of node indexes in dependence on size of each batch.

20. A computer system for inference processing of a decision tree model in processing apparatus which executes vector instructions to perform inference computations on vectors of operands stored in vector registers of the apparatus,
the computer system comprising:
one or more computer processors, one or more computer-readable storage media, and program instructions stored on the one or more of the computer-readable storage media for execution by at least one of the one or more processors, wherein the computer system is capable of performing a method comprising:
for each decision tree of the decision tree model, indexing nodes of the decision tree by consecutive node indexes which are assigned to nodes in a breadth-first order and increase with node-depth in the tree;

during the inference processing, storing a vector of N node indexes, corresponding to a set of nodes for which N inference computations will be performed in parallel, in a vector register of the processing apparatus; and adaptively select a granularity N of the vector of node indexes, in dependence on the node-depth of nodes in the set of nodes, to accelerate inference processing of the decision tree model.

\* \* \* \* \*